(12) United States Patent
Kasunich et al.

(10) Patent No.: US 8,400,092 B2
(45) Date of Patent: Mar. 19, 2013

(54) MOTOR DRIVE COMPONENT VERIFICATION SYSTEM AND METHOD

(75) Inventors: John M. Kasunich, Mayfield Heights, OH (US); Stephen E. Denning, Silver Lake, OH (US); Richard H. Radosevich, Waukesha, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 427 days.

(21) Appl. No.: 12/838,190

(22) Filed: Jul. 16, 2010

(65) Prior Publication Data

US 2012/0013285 A1    Jan. 19, 2012

(51) Int. Cl.
*G01R 31/02* (2006.01)
(52) U.S. Cl. ............... 318/490; 318/400.33; 318/632
(58) Field of Classification Search ............ 318/490, 318/400.33, 632, 164, 561, 400.02, 445, 318/685, 560
See application file for complete search history.

(56) References Cited

U.S. PATENT DOCUMENTS 6,232,871 B1 *  5/2001  Spiess ..................... 340/10.4

* cited by examiner

*Primary Examiner* — Karen Masih
(74) *Attorney, Agent, or Firm* — Fletcher Yoder, P.C.; Alexander R. Kuszewski; John M. Miller (57) ABSTRACT

A technique is provided for verifying the proper selection, installation, communication and operability of components in power electronic systems, such as motor drives. A processing circuit is coupled to multiple components or subsystems that identify themselves to the processing system. An identification code is stored that is compared to a similar code built based upon the information reported by the components at the time of commissioning, operation or servicing. If the comparison indicates that all components are properly installed, and communicating and operative, operation may continue. The technique may be applied in parallel motor drives at a power layer level to allow separate and parallel verification of component and component operation in the parallel drives.

20 Claims, 4 Drawing Sheets

MOTOR DRIVE COMPONENT VERIFICATION SYSTEM AND METHOD

BACKGROUND

The invention relates generally to the field of motor drives and similar devices comprising a number of power electronic circuits. More particularly, the invention relates to techniques for verifying proper selection, installation, and operability of components in such devices.

A wide range of power electronic devices are known and currently available, particularly in automation context. For example, many electric motors and other loads in industrial, commercial, automation, process, transportation, and other contexts are powered by electronic circuits that control and regulate the characteristics of electrical power based upon the application and load characteristics. In a particularly important range of products, variable frequency, multi-phase output is provided for regulating the speed, torque, and other characteristics of driven motors. Motor drives used in such applications have become increasingly complex, with multiple layers of control, monitoring, drive, and power circuitry interconnected for generating the desired output signals.

A typical motor drive used for automation applications includes a converter that transforms alternating current (AC) power to direct current (DC) power that is applied to a DC bus. Power from the DC bus is then converted via an inverter to controlled frequency AC power for application to the load. The converter may be passive (non-switched) or active (switched), while the inverter circuitry typically includes sets of power electronic switches that are switched between conducting and non-conducting states to provide the desired output waveform. Such circuits are available in single and multi-phase configurations.

As load requirements and circuitry become increasingly complex, significant modularity has been developed for circuit topologies of the type described above. For example, smaller loads may be driven by a single converter coupled to a single inverter via a single DC bus. Increasingly, however, larger loads may be powered by parallel inverters or entire paralleled drives, the output signals of which are joined to provide a single, higher powered output. Inverters or converters are often manufactured in a wide range of sizes to accommodate different loads. Many components in such a family of inverters or converters will be the same for all sizes, while other components will be different depending on the specific power rating.

In all of these topologies, challenges arise at multiple stages in the life of the equipment, including manufacturing, operation, and servicing. In particular, the equipment may employ multiple separate, modular components that may be interconnected to provide the desired functionality. Such components may include control circuitry, interface circuitry, power layer circuitry, switching modules, feedback and monitoring components, and so forth. When the equipment is initially manufactured and commissioned, if erroneous components have been used, this can lead to malfunction and even failure of the overall system or of certain components of the system. Similarly, during operation, the failure of certain devices or certain signal communications can lead to disabling or failure of the system or of components. During servicing, where certain components are factory or field replaceable, or repairable, the erroneous selection or connection of such components can similarly lead to system or component failure.

There is a need in the field, therefore, for techniques that will reduce the risk or avoid the potential for improper component selection and installation, and that can monitor operation of components during their service life.

BRIEF DESCRIPTION

The present invention provides systems and methods for verifying proper component selection and installation designed to respond to such needs. The techniques can be used during manufacturing and commissioning stages, as well as during operation and subsequent servicing. In accordance with one aspect of the invention, a motor control system comprises a plurality of monitored circuit components configured to cooperate to generate output signals for powering an electric motor, and memory circuitry configured to store reference identification data representative of circuit components that should be present, correct, communicating and operative in the system. Processing circuitry is coupled to the memory circuitry and configured to receive data from each of the monitored circuit components, to generate component identification data, and to compare the component identification data to the reference data to determine whether all monitored circuit components are present, correct, communicating and operative.

In accordance with another aspect of the invention, a motor control system comprises a plurality of motor drives coupled in parallel to produce a combined multi-phase output. Each motor drive comprises a plurality of monitored circuit components configured to cooperate to generate output signals for powering an electric motor, memory circuitry configured to store reference identification data representative of the monitored circuit components, and processing circuitry coupled to the memory circuitry and configured to receive data from each of the monitored circuit components, to generate component identification data, and to compare the component identification data to the reference data to determine whether all monitored circuit components are present, correct, communicating and operative. Common control circuitry is coupled to the processing circuitry of each inverter drive and configured to receive data indicative of results of the comparison and to control operation of the inverter drives based upon the received data.

The invention also provides a motor control method comprising coupling a plurality of monitored circuit components in a motor drive, the circuit components being configured to cooperate to generate output signals for powering an electric motor. Identification data is communicated from each of the monitored circuit components to processing circuitry. In the processing circuitry, composite identification data is generated based upon the communicated identification data, and the composite identification data is compared to reference identification data representative of circuit components that should be present, correct, communicating and operative in the motor drive. Various actions may then be taken, including storing data representative of the results of the comparison, disabling the drive, and so forth.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
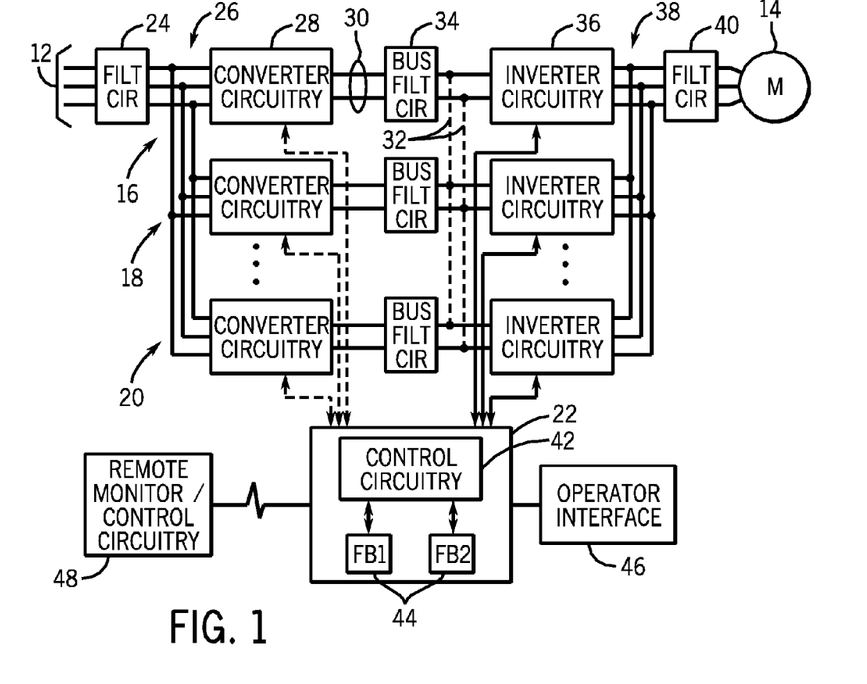
FIG. 1 is a diagrammatical representation of a motor drive system in accordance with certain aspects of the present disclosure.

FIG. 1 represents a drive system 10 in accordance with aspects of the present disclosure. The drive system is configured to be coupled to a source of AC power, such as the power grid, as indicated by reference numeral 12, and to deliver conditioned power to a motor 14 or any other suitable load. The system 10 comprises a plurality of individual drives coupled to one another in parallel to provide power to the load. In the example illustrated in FIG. 1, for example, a first drive 16 is illustrated as coupled to a second drive 18 and a further drive 20 which may be the third, fourth, fifth or any suitable terminally numbered drive. A presently contemplated embodiment may accommodate up to 5 parallel drives, although fewer or more may be configured in the same way. It should be noted that certain aspects of the techniques described herein may be used with a single drive. However, other aspects are particularly well-suited for multiple parallel drives.

A controller 22 is coupled to the circuitry of each drive and is configured to control operation of the circuitry as described more fully below. In a presently contemplated embodiment, the controller may be housed in one of the drives or in a separate enclosure. Appropriate cabling (e.g., fiber optic cabling) is provided to communicate control and feedback signals between the controller and the circuitry of the individual drives. The controller will coordinate operation of the drives to ensure that the provision of power is shared and that operation of the drives is synchronized sufficiently to provide the desired power output to the motor. In the embodiment illustrated in FIG. 1, power filtration circuitry 24 may be provided upstream of the motor drives. Such circuitry may be provided upstream of a line-side bus 26 or similar circuitry may be provided downstream of the bus in each of the drives. Such circuitry may include inductors, capacitors, circuit breakers, fuses, and so forth that are generally conventional in design and application.

The power bus 26 distributes three phases of AC power between the individual drives. Downstream of this bus, each drive includes converter circuitry 28 that converts the three phases of AC power to DC power that is applied to a DC bus 30. The converter circuitry 28 may be passive or active. That is, in a presently contemplated embodiment non-switched circuitry alone is used to define a full wave rectifier that converts the incoming AC power to DC power that is applied to the bus. In other embodiments the converter circuitry 28 may be active, including controlled power electronic switches that are switched between conducting and non-conducting states to control the characteristics of the DC power applied to the bus.

Continuing with the components of each drive, bus filtration circuitry 34 may be provided that conditions the DC power conveyed along the DC busses 30. Such filtration circuitry may include, for example, capacitors, inductors (e.g., chokes), braking resistors, and so forth. In some embodiments common devices may be provided on the DC busses, which may be coupled to one another by links illustrated by reference numeral 32.

Each drive further includes inverter circuitry 36. As will be appreciated by those skilled in the art, such circuitry will typically include sets of power electronic switches, such as insulated gate bipolar transistors (IGBTs) and diodes arranged to allow for converting the DC power from the bus to controlled frequency AC output waveforms. The inverters thus create three phases of controlled frequency output, with each phase being combined along an output bus 38. The combined power may be applied to output filtration circuitry 40, which may include magnetic components that couple the output power between the phases. Such circuitry may also be provided on each individual inverter output prior to the load-side bus 38.

The controller 22 will typically include control circuitry 42 that is configured to implement various control regimes by properly signaling the inverter circuitry (and, where appropriate, the converter circuitry) to control the power electronic switches within these circuits. The control circuitry 42 may, for example, include any suitable processor, such as a microprocessor, field programmable gate array (FPGA), memory circuitry, supporting power supplies, and so forth. In motor drive applications, the control circuitry may be configured to implement various desired control regimes, such as for speed regulation, torque control, vector control, start-up regimes, and so forth. In the embodiment illustrated in FIG. 1, various functional circuit boards 44 are linked to the control circuitry and may be provided for specific functions. For example, a wide range of options may be implemented by the use of such circuitry, including the control regimes mentioned above, as well as various communications options, safety options, and so forth.

The controller will typically allow for connection to an operator interface, which may be local at the controller and/or remote from it. In a presently contemplated embodiment, for example, an operator interface 46 may be physically positioned on the controller but removable for hand-held interfacing. The interface circuitry (e.g., portable computers) may also be coupled permanently or occasionally to the controller, such as via Internet cabling, or other network protocols, including standard industrial control protocols. Finally, the controller may be coupled to various remote monitoring and control circuitry as indicated by reference numeral 48. Such circuitry may include monitoring stations, control stations, control rooms, remote programming stations, and so forth. It should be noted that such circuitry may also include other drives, such that the operation of the system 10 may be coordinated, where desired, with that of other equipment. Such coordination is particularly useful in automation settings where a large number of operations are performed in a coordinated manner. Thus, the control circuitry 42 may form its control in coordination with logic implemented by automation controllers, separate computers, and so forth.

Figure 2:
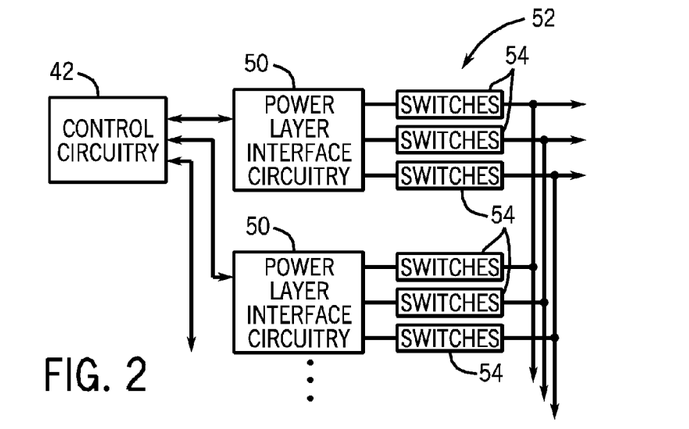
FIG. 2 is further diagrammatical representation of a portion of the system of FIG. 1 illustrating power layer interface circuitry used in the multiple parallel motor drives.

FIG. 2 illustrates certain components that may be included within the individual drives described above. For example, the control circuitry 42 is illustrated as being coupled to power layer interface circuitry 50. Such circuitry will be provided in each drive and will operate independently within the drive, but in a coordinated manner under the control of the control circuitry. The power layer interface circuitry may include a range of circuits, such as a dedicated processor, memory, and so forth. In a presently contemplated embodiment, the power layer interface circuitry 50 includes an FPGA that implements programming for carrying out control of the power electronic switches within the individual drive. The power layer interface circuitry thus communicates with the power layer as indicated by reference numeral 52, which is itself comprised of sets of power electronic devices, such as IGBTs and diodes. These switches are illustrated generally by reference numeral 54. In general, one or several types of feedback will be provided in the circuitry. Such feedback may include, for example, output voltages, output currents, temperatures, and so forth. Other feedback signals may be provided throughout the system, such as to allow the control circuitry to monitor the electrical parameters of the incoming power, the outgoing power, the DC bus power, and so forth.

The structure and operation of the control circuitry may be substantially similar to those described in U.S. published patent application no. 20100123422, entitled "Motor Controller with Deterministic Synchronous Interrupt having Multiple Serial Interface Backplane," filed by Campbell et al. on Nov. 17, 2008, which is hereby incorporated into the present disclosure by reference.

Figure 3:
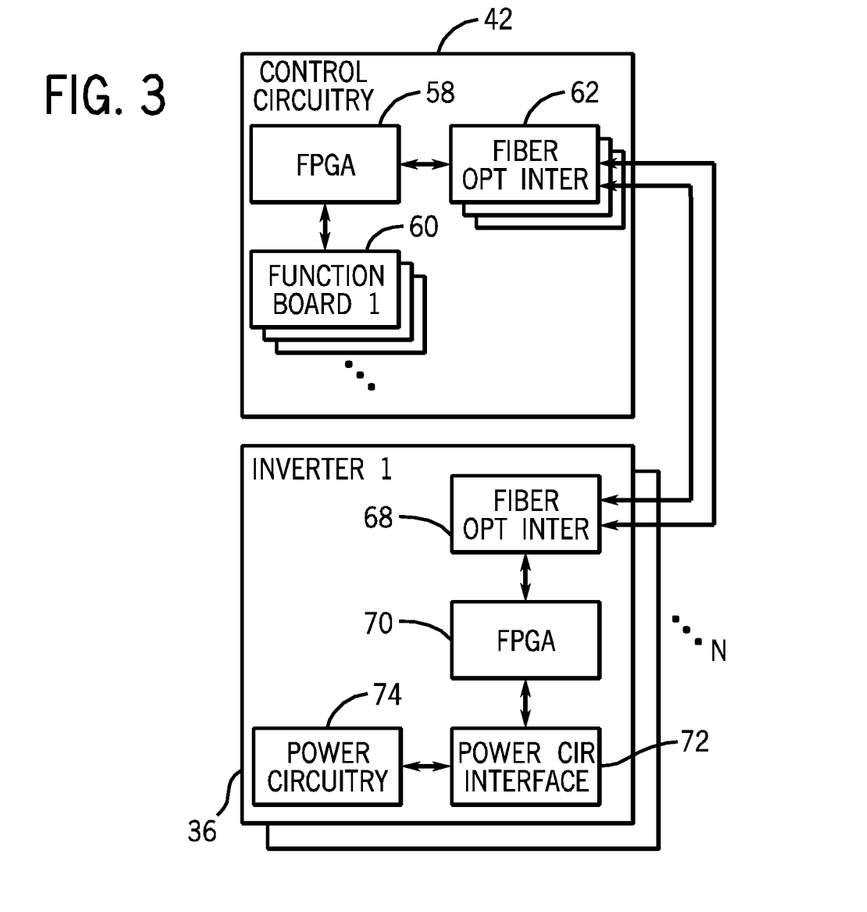
FIG. 3 is a diagrammatical representation of certain functional circuits and data exchange devices for communicating between control circuitry and power circuitry in accordance with aspects of the present technique.

FIG. 3 illustrates an exemplary manner in which certain functional components of the individual drives may be coupled to provide coordinated operation of the drives within the system. As shown in FIG. 3, the control circuitry 42 is coupled to the inverter circuitry 36 by the intermediary of optical interfaces. As indicated above, the control circuitry will include any suitable processing circuitry, such as an FPGA 58 in the embodiment illustrated in FIG. 3. This FPGA may include its own memory or separate memory may be provided (not shown). As also mentioned above, the FPGA 58 may perform various functions in cooperation with various function boards as indicated by reference numeral 60. The FPGA communicates with the various inverters by a series of fiber optics interfaces 62 for the individual drives. These components, in turn, communicate with a fiber optic interface 68 at the power level of each inverter. The circuitry at the power level will typically include a further FPGA 70 which may be provided on a common support (e.g., circuit board) with a power circuit interface 72. The support, which may be the present context termed the power layer interface, serves to receive signals from the control circuitry, to report signals back to the control circuitry, to generate drive signals for the power electronic switches, and so forth. The circuitry may also perform certain test functions, such as to verify the one or more drives can be disabled when desired. The power circuit interface 72 may convert control signals to drive signals for driving the power circuitry as indicated generally by reference numeral 74. The power circuitry 74 will include the power electronic switches as described above.

Figure 4:
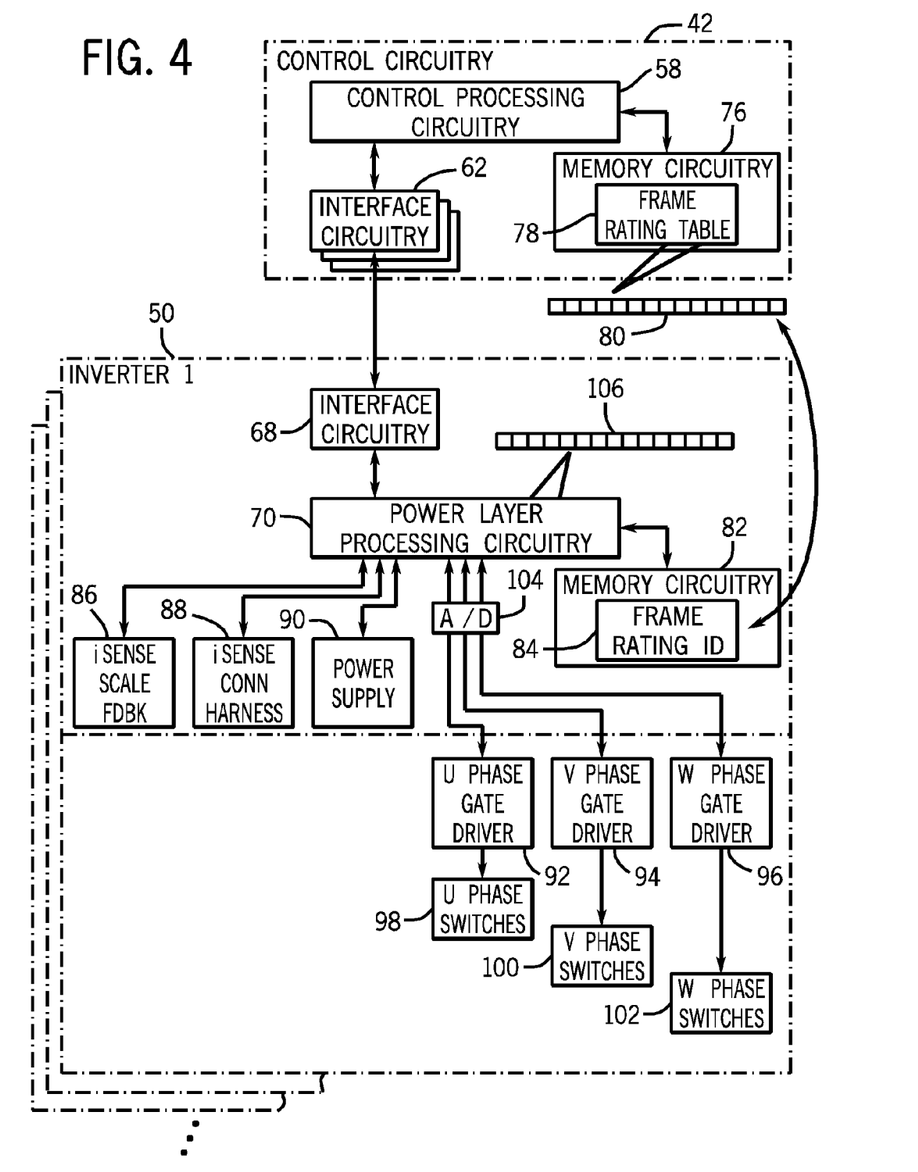
FIG. 4 is a diagrammatical representation of certain exemplary system components in a power electronic system (e.g., a motor drive) designed to verify proper selection, installation and operation of multiple components and subsystems.

FIG. 4 is a diagrammatical representation of certain of the components described above interconnected and functional to assist in verification of the proper selection, installation, and operation of certain of the system components, particularly of the power layer circuitry. FIG. 4 illustrates the control circuitry 42 discussed above as coupled to one inverter through the intermediary of interface circuitry 50. Control processing circuitry 58, such as an FPGA or other processing circuitry, communicates via its interface circuitry 62, whereas power layer processing circuitry 70, such as an FPGA or other processing circuitry communicates through its interface circuitry 68.

As noted above, the control processing circuitry 58 may include its own memory circuitry or separate memory circuitry may be provided. In the illustration of FIG. 4, memory circuitry 76 is provided to support the control processing circuitry 58. The memory circuitry 76 may include any suitable memory design, such as random access memory, read-only memory, erasable programmable read-only memory, electrically erasable programmable read-only memory, and so forth. Relevant in the present context, is a frame rating table 76 that is stored in memory circuitry 76. As discussed in greater detail below, this frame rating table 78 includes various configurations for systems that may interface with the control circuitry 42. That is, the control circuitry may be designed to work with a number of different products and circuitry configurations. These may vary in the number of phases powered, the amperage rating of the power circuitry, the voltage rating on the power circuitry, the intended frame size of motors powered by the circuitry, as well as by the particular components included in the circuitry. In the case of motor drives, the frame rating table will typically include parameters of particular motors that are to be driven, such as, for example, a frame 8 C, with an amperage rating of 740 A and a voltage rating of 480 V. Many such ratings may be provided in the table. The table also defines a component identification 80 that corresponds to a particular configuration in the frame rating table. As discussed in greater detail below, the component identification 80 may be a multi-bit word or value that may be subdivided into fields to identify particular components that should be present and operative in a particular product configuration.

The power layer processing circuitry 70 is also associated with memory circuitry as indicated by reference numeral 82. This memory circuitry, again, may be provided as a dedicated part of the processing circuitry, or separate memory may be provided. In a presently contemplated embodiment, the memory circuitry 82 comprises an electrically erasable programmable read-only memory that is mounted separately on a common substrate or board with the processing circuitry, and that will remain resident on the board even if the processing circuitry is changed for service reasons. As discussed below, this allows for the functionality described herein to continue despite changes in components, including the power layer processing circuitry. The memory circuitry 82 stores, among other things, a frame rating identification 84 which is substantial identical to the particular component identification 80 from the frame rating table for the particular product configuration. That is, when the device is initially specified, built and commissioned, an entry is made in memory circuitry 82 that includes an identification (e.g., a multi-bit word or value) substantially identical to or derived from the component identification 80. The frame rating identification 84 at the power layer, then, allows for later verification of components provided in or connected to the power layer as described below.

The power layer processing circuitry may interface with a number of devices as illustrated in FIG. 4. For example, in a currently contemplated embodiment, the circuitry may send and/or receive data from a range of components or subsystems. In the embodiment illustrated in FIG. 4, for example, a current sensing scale signal is transmitted corresponding to the value of a burden resistor used to sense current for the output of the inverter. Any one of several such feedback resistors may be provided in a modular fashion, with the particular resistor selected being based upon the anticipated current range that will be sensed. The circuitry may also receive signals indicating that a current sensing cable is communicative as indicated at reference numeral 88. As will be appreciated by those skilled in the art, such current sensors may be designed in various manners, such as toroidal windings through which a phase conductor passes. If the connector harness is improper or is improperly installed, or further if the harness does not properly communicate signals back to the circuitry, closed-loop control of current may be impeded or impossible.

Further circuitry communicating with the processing circuitry 70 may include a power supply 90. In a currently contemplated embodiment, this power supply is a separate board that is supported in the power layer support along with a power layer interface board that supports the processing circuitry 70. Here again, multiple such power supplies may be available and the particular power supply selected for the particular application may be important to the proper operation of the power layer interface circuitry.

In addition to these components, in the embodiment illustrated in FIG. 4, the processing circuitry communicates with and receives identification information from gate drive circuitry for each of the output phases U, V, and W, as indicated by reference numerals 92, 94 and 96. This driver circuitry may be provided on the same circuit board as the processing circuitry, but in the presently contemplated embodiment each driver circuitry is provided on a separate printed circuit board. Such driver circuitry converts gate drive timing signals to gate drive signals needed for switching the power electronic switches of the respective output phase to generate the desired output waveform. Thus, gate driver circuits 92, 94 and 96 are illustrated as coupled to their phase switches 98, 100 and 102, respectively. Switches of differing current and/or voltage ratings will require different gate drive circuits. Certain of the components that communicate with the processing circuitry 70 may provide analog signals which are converted to digital signals as indicated by the analog-to-digital converter 104 in FIG. 4. It should also be noted that other components in addition to or different from those discussed above may provide component identification data to the processing circuitry as described below.

In operation, each of the components coupled to the processing circuitry provide, in addition to the signals and data they normally provide for operation of the drive, identification data that uniquely identifies itself. Based upon the information received, then, the processing circuitry 70 computes or compiles an identification 106. In a present embodiment, the identification comprises a 32-bit word or value with separate fields populated based upon the data received from the various components. Other protocols for establishing such coded identification may, of course, be employed. The identification 106 may then be compared to the frame rating identification 84 stored in the memory circuitry (which, again is equivalent to the component identification 80 for the particular product as referenced in the frame rating table 78). If the comparison indicates the same code, the processing circuitry recognizes that all components are proper, properly installed, and properly functional, and operation may proceed. If a mismatch occurs, on the other hand, this may result in various prescribed actions, including disabling of the drive, reporting of faults to the control circuitry, and so forth.

The identification and comparison process may occur at specific points in the operation of the drive, particularly at startup, or as in a presently contemplated embodiment, may occur repeatedly and cyclically during operation. Such cyclic application of the process allows for evaluation of the proper functional state of the components during operation of the system. Moreover, the identification compiled by the processing circuitry at the inverter level may be reported back to the control circuitry, which may evaluate the operation of the components and compile a log indicating times, operating state, and so forth. This also permits the control circuitry to recognize which component may have malfunctioned, and at what time. Such evaluation may be used for diagnostics, root cause analysis, and so forth. It should also be noted that the comparison made between the compiled identification and the frame rating identification may be performed at the power layer level or in the control circuitry, or both.

Figure 5:
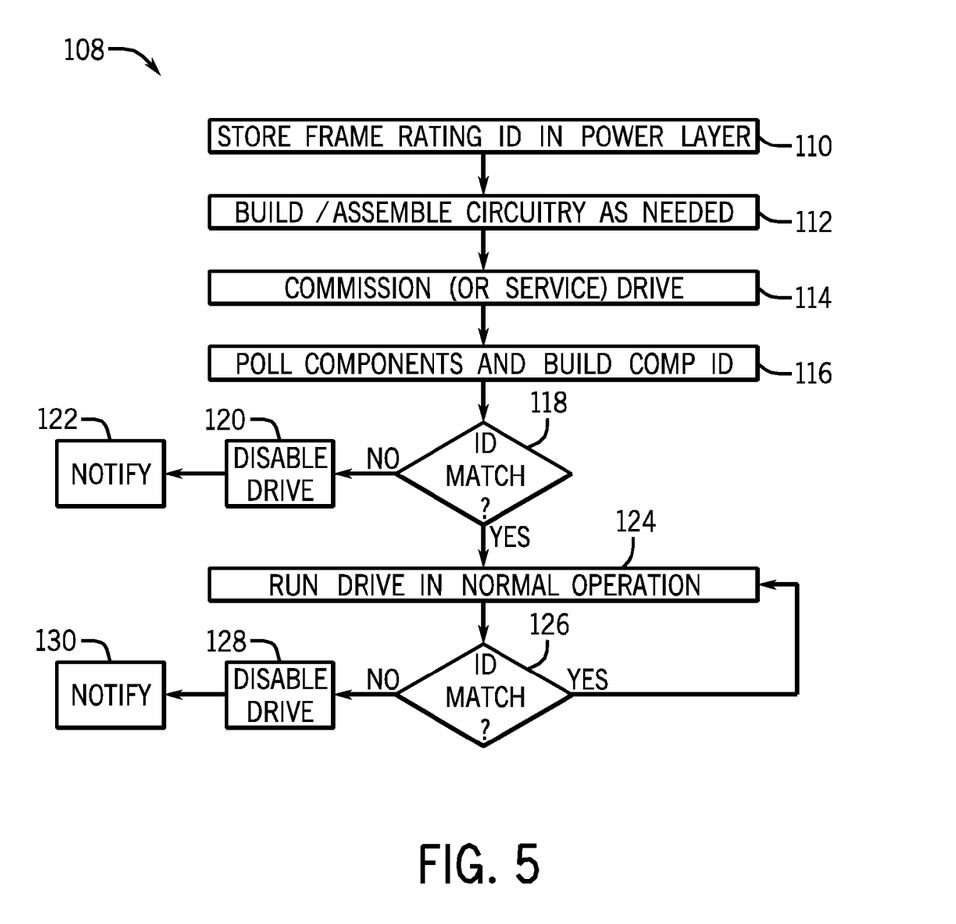
FIG. 5 is a block diagram illustrating exemplary logic for carrying out such verification.

FIG. 5 illustrates exemplary logic, indicated by reference numeral 108, for carryout the verification techniques described above. As indicated above, the process may begin with storing the frame rating identification in the power layer as indicated by step 110. It should be noted that this is particularly useful insomuch as the power layers may be modular throughout a product line. Moreover, such power layers themselves may be, from time to time, replaced, or certain components may be replaced. Where desired, the process may proceed based upon a similar identification simply stored in the control circuitry. However, where multiple drives are connected in parallel, with common control circuitry, again it may be particularly useful to allow each of the power layers to perform a separate verification and report results to the common control circuitry.

At step 110, then, the system is built and assembled as specified in the system design. This will include selection and identification of all of the various components discussed above, including the power layer circuitry, the current sensing devices, the power supply, the output phase gate driver circuits, and so forth. Following assembly of the drive, then, the drive is commissioned as indicated at step 114. As discussed above, similar processes after this step may be performed upon subsequent maintenance or servicing. Commissioning the drive typically includes starting the drive, carrying out certain tests procedures, quality control, documentation, and so forth. As part of this commissioning, the processing circuits of each power layer poll the components and build the component identification as discussed above and as summarized at step 116. Again, in a present embodiment, the identification data has fields that are populated based upon the data reported by each component. If a component is absent, is disconnected, or as otherwise non-communicative, the corresponding portion of the identification may remain at a default level (e.g., all 0's).

At step 118, then, a comparison is made to determine whether the compiled component identification based upon the reported data matches the frame rating identification. If the two do not match, this may be taken to indicate that either a component was mis-selected, a component was improperly installed or connected, or that a component is not properly functioning (or communicating). In such cases, it will generally be desirable to disable the drive as indicated at step 120 and to provide a notification to the control circuitry (and ultimately to a human operator) as indicated at step 122. If, on the other hand, the information matches, the verification process is successful and the drive may be placed into operation.

Subsequently, then, the drive may be run in normal operation as indicated at step 124. Such operation may comprise any range of functionality that is programmed into and permitted for the drive and its components. In a presently contemplated embodiment, the process of identification and verification continues throughout this operation with the components being periodically polled, component identification data being compiled, and the comparison made as indicated at step 126 in FIG. 5. If, during operation, the results continue to be positive, operation may continue. If at any time, however, a mismatch occurs, this may be taken to mean that a component has either become disconnected, has become non-communicative, or is not functioning properly. In such cases, it will typically be desirable to disable the drive as indicated at step 128, and to provide a notification to the control circuitry and, ultimately, to a human operator as indicated at step 130. Again, as noted above, the notification provided at steps 122 and 130 will typically permit the termination of a fault condition, but also a particular component that may have failed, the type of fault if available, and the time the fault occurred.

As discussed above, the same process may be carried out at the time of servicing, or just subsequent to servicing, particularly where any components are removed, replaced, disconnected, or repaired. The process may be assumed to be recommenced, then, at step 114 in FIG. 5 at which time the components are polled and a component identification is rebuilt as indicated at step 116 for the comparison described above. This process allows for providing a clear indication of the appropriate servicing, replacement, connection and operability of the components following maintenance and service operations throughout the life of the equipment.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor control system comprising:
   a plurality of monitored circuit components configured to cooperate to generate output signals for powering an electric motor;
   memory circuitry configured to store reference identification data representative of circuit components that should be present, correct, communicating and operative in the system; and
   processing circuitry coupled to the memory circuitry and configured to receive data from each of the monitored circuit components, to generate component identification data, and to compare the component identification data to the reference data to determine whether all monitored circuit components are present, correct, communicating and operative.

2. The system of claim 1, wherein the circuit components comprise power electronic switch control and sensing components, and wherein the processing circuitry comprises power layer circuitry.

3. The system of claim 2, wherein the circuit components comprise current sensor components and driver circuits for power electronic switches that generate controlled frequency AC output waveforms.

4. The system of claim 1, wherein the circuit components, the memory circuitry and the processing circuitry comprise one of a plurality of self-similar motor drives coupled in parallel to produce a combined multi-phase output, and wherein each motor drive comprises substantially identical circuit components, memory circuitry and processing circuitry.

5. The system of claim 4, comprising common control circuitry coupled to the processing circuitry of each motor drive.

6. The system of claim 5, wherein the processing circuitry of each motor drive is configured to report results of the comparison to the common control circuitry.

7. The system of claim 6, wherein the common control circuitry is configured to disable at least one of the motor drives if the comparison in the respective motor drive indicates that at least one of the monitored circuit components is not present, is incorrect, is non-communicating or is inoperative.

8. The system of claim 7, wherein the common control circuitry is configured to disable all of the motor drives if the comparison in any one of the motor drives indicates that at least one of the monitored circuit components is not present, is incorrect, is non-communicating or is inoperative.

9. A motor control system comprising:
   a plurality of motor drives coupled in parallel to produce a combined multi-phase output, each motor drive comprising a plurality of monitored circuit components configured to cooperate to generate output signals for powering an electric motor, memory circuitry configured to store reference identification data representative of the monitored circuit components, and processing circuitry coupled to the memory circuitry and configured to receive data from each of the monitored circuit components, to generate component identification data, and to compare the component identification data to the reference data to determine whether all monitored circuit components are present, correct, communicating and operative; and
   common control circuitry coupled to the processing circuitry of each inverter drive and configured to receive data indicative of results of the comparison and to control operation of the inverter drives based upon the received data.

10. The system of claim 9, wherein the common control circuitry is configured to disable at least one of the motor drives if the comparison in the respective motor drive indicates that at least one of the monitored circuit components is not present, is incorrect, is non-communicating or is inoperative.

11. The system of claim 10, wherein the common control circuitry is configured to disable all of the motor drives if the comparison in any one of the motor drives indicates that at least one of the monitored circuit components is not present, is incorrect, is non-communicating or is inoperative.

12. The system of claim 9, wherein the circuit components comprise power electronic switch control and sensing components, and wherein the processing circuitry comprises power layer circuitry.

13. The system of claim 12, wherein the circuit components comprise current sensor components and driver circuits for power electronic switches that generate controlled frequency AC output waveforms.

14. A motor control method comprising:
   (a) coupling a plurality of monitored circuit components in a motor drive, the circuit components being configured to cooperate to generate output signals for powering an electric motor;
   (b) communicating identification data from each of the monitored circuit components to processing circuitry;
   (c) generating in the processing circuitry composite identification data based upon the communicated identification data;
   (d) comparing the composite identification data to reference identification data representative of circuit components that should be present, correct, communicating and operative in the motor drive; and
   (e) storing data representative of the results of the comparison.

15. The method of claim 14, comprising disabling the motor drive if the comparison indicates that any of the monitored components is not present, is incorrect, is non-communicating or is inoperative.

16. The method of claim 14, wherein the motor drive is one of a plurality of motor drives in a motor drive system, outputs of each of the plurality of motor drives being combined to produce a common multi-phase output.

17. The method of claim 16, wherein steps (c) and (d) are performed in processing circuitry of each respective motor drive in the motor drive system.

18. The method of claim 16, wherein at least one of steps (c) and (d) is performed in common control circuitry coupled to all of the motor drives in the motor drive system.

19. The method of claim 16, comprising disabling at least one of the motor drives if the comparison indicates that at least one of the monitored circuit components of the respective motor drive is not present, is incorrect, is non-communicating or is inoperative.

20. The method of claim 19, comprising disabling all of the motor drives if the comparison indicates that at least one of the monitored circuit components of any of the motor drives is not present, is incorrect, is non-communicating or is inoperative.

* * * * *